June 12, 1962 A. H. FOWLER 3,039,032
ERROR COMPENSATOR FOR A POSITION TRANSDUCER
Filed March 30, 1960
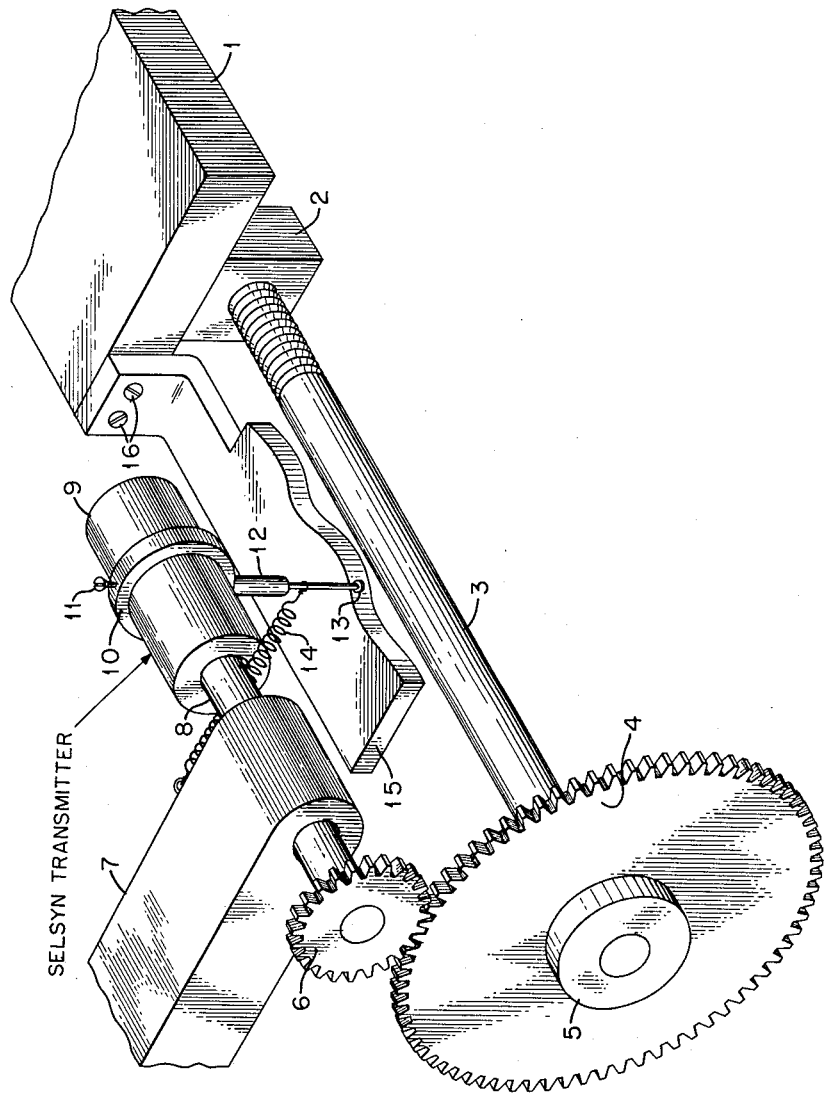
INVENTOR.
Andrew H. Fowler
BY
ATTORNEY United States Patent Office 3,039,032
Patented June 12, 1962

3,039,032
ERROR COMPENSATOR FOR A POSITION TRANSDUCER
Andrew H. Fowler, Oak Ridge, Tenn., assignor to the United States of America as represented by the United States Atomic Energy Commission
Filed Mar. 30, 1960, Ser. No. 18,790
3 Claims. (Cl. 318—30)

This invention relates to a device for eliminating the effect of leadscrew errors in positioning machines.

Many machines incorporate a slide and leadscrew arrangement for obtaining linear motion of a slide from rotary motion of a leadscrew. In some of these machines, the slide is used as a base for supporting a metallic member which may be machined, such as in a planer operation, to thus produce an end product which has very precise measurements. Such machined elements may find usefulness in missile guidance systems. Most automatically controlled machines of this type have a position transducer to provide a signal proportional to the slide position. The transducer may sense the angular position of a shaft which is either connected directly or geared to the leadscrew which moves the slide. Any variation in the gear ratio or lead of the screw will cause an error in the signal with respect to the linear position of the slide. Even with the best manufacturing practices, this error tends to be excessive, as large as .0005", and the machined element is not within the tolerances required by the systems in which these elements are to be used.

It is possible for a highly skilled machinist, after considerable experience, by trial and error to machine a work piece with the desired precision to thus produce an end product with the desired precise dimensions. However, there is always the inherent possibility upon the part of the machinist to deviate in his operation of the machine so that the machined elements will not all have the same dimensions because of the judgment required upon the part of the operator in making the manual corrections for compensating for the errors due to variation in the gear ratio or lead of the screw.

It is desirable to provide a system for automatically compensating for all the reproducible errors in the transducer signal which can be related to the slide position, so that very precise machined elements may be produced, all having substantially identical dimensions, without requiring any special skill upon the part of the operator.

In one such system an error cam is fixed to the slide, a follower moves along the cam, in the direction of slide movement, and the follower serves to turn the leadscrew nut. Large forces must be transmitted through the leadscrew and its nut to move the slide and object machined, however, so that a correspondingly large torque may be required to rotate the nut about the screw as desired. Strong and heavy construction is required, therefore. It would be highly desirable to devise a cam-follower system where the contact pressure is small and independent of the large forces being transmitted through the leadscrew. Moreover, it is difficult to construct a cam of the required accuracy.

With a knowledge of the limitations of the prior art devices, as discussed above, it is a primary object of this invention to provide means for automatically eliminating the effect of leadscrew errors in a position transducer which provides an output signal proportional to the position of a movable member in a positioning machine.

It is still another object of this invention to provide a device for obtaining linear motion of a slide from rotary motion of a leadscrew and including means for providing a signal proportional to the slide position with means for automatically compensating said signal for leadscrew errors.

These and other objects and advantages of this invention will become apparent upon a consideration of the following detailed specification and the accompanying drawing, wherein: the single FIGURE illustrates one embodiment in which the principles of this invention may be carried out.

The above objects have been accomplish in the present invention by providing a corrector cam mounted on the slide, a cam follower, and a transducer rotatable by the follower to compensate for all the reproducible errors in the transducer signal which can be related to the slide position. The corrector cam and its follower perform the compensation by changing the angular position of the transducer body, rather than that of the nut, by an amount that is a function of the slide position and the error at that position. The position transducer or transmitter may be a selsyn with the stator field coils located in the housing surrounding the selsyn rotor. The rotor shaft carries a small gear which is coupled to a large gear carried by the leadscrew shaft and rotates therewith, while the housing is rotated as a function of the transmission error. The selsyn output is thereby compensated to give much more accurate indication of the slide position, the cam contour accuracy requirement being reduced by the amount of the gear ratio.

In the single FIGURE shown on the drawing, a slide member 1 is affixed to a leadscrew nut 2. This leadscrew nut 2 is located at one end of the bottom of the slide member 1. This slide member 1 may be the base of a planing machine or it may be the base of any other type of machine in which a machining operation is to be performed. A leadscrew shaft 3 threadedly engages the leadscrew nut 2. A gear 4 is affixed to the other end of shaft 3 and may be keyed thereto by any conventional keying means. The gear 4 is held onto the end of shaft 3 by a member 5 which may be welded to the shaft 3. Rotary motion is imparted to the shaft 3 through a conventional motor and gear train, not shown, coupled to the gear 4. Rotation of the shaft 3 will impart linear motion to the slide member 1 through the leadscrew and leadscrew nut coupling.

In order to provide an indication of the linear position of the slide member 1, there is provided a position transducer or transmitter. This transducer may be a selsyn having a rotor and stator field coils concentrically disposed around said rotor in a suitable housing. The rotor of the selsyn is affixed to one end of a shaft 8, which shaft is supported by suitable bearing means disposed in a shaft supporting member 7. The other end of shaft 8 has affixed thereto a gear 6. Gear 6 is suitably keyed to the shaft 8 by any conventional keying means. Gear 6 is so positioned that the teeth thereof engage the teeth of the gear 4. The gear 6 is much smaller in diameter than the gear 4, so that a relatively small rotation of the gear 4 will impart a correspondingly larger rotation of the gear 6 affixed to the rotor of the position transducer. Surrounding the rotor of the transducer is a housing 9 in which are positioned the stator field coils of the transducer. As the rotor of the transducer is rotated during rotation of the shaft 3, there will be produced an output signal which is a function of the relative position of the rotor with respect to the field coils. This output signal is proportional to the linear position of the slide member 1. The selsyn transmitter may be coupled to a conventional selsyn receiver, not shown. However, no novelty is claimed for the receiver, but it is only mentioned in the interest of disclosing a complete system.

The output signal from selsyn transmitter 9 is not always an accurate signal in the absence of the compensating means to be described below, due to variations in the gear ratio and/or lead of the screw. Compensating corrector cam 15 is coupled through a cam follower 13 to the housing 9 of the selsyn transducer. Corrector cam 15 is affixed to the slide member 1 by a pair of screws 16, as shown in the drawing. The cam follower consists of a roller 13 affixed to one end of a member 12, which member is in turn affixed to a sleeve member 10 closely fitted around housing 9. This sleeve member 10 is held in a fixed position with respect to the housing 9 by a set screw 11. The roller 13 is held in engagement with the cam surface of cam 15 by means of a resilient spring 14, one end of which is affixed to the member 12 and the other end of which is affixed to the supporting member 7. The design of the cam 15 can be readily determined with the knowledge of the known errors of any given machine. The corrector cam 15 will effect angular oscillatory movement of the selsyn housing 9 by action of the roller 13 of the member 12 following the contour of the cam. The angular position of the housing 9 effected by the movement of member 12 by the cam 15 is a function of both the slide position and the error at that position. Since the housing 9 of the selsyn transmitter is rotated as a function of any transmission error, the output of the selsyn is thereby compensated to provide a continuous and accurate output signal.

Use of the above novel concepts in a typical machining operation has resulted in the production of uniformly machined parts with a high precision of accuracy without the necessity of any undue skill upon the part of the operator.

This invention has been described by way of illustration rather than limitation, and it should be evident that this invention is equally applicable in fields other than those described.

What is claimed is:

1. In a device for transmitting rotary motion into linear motion including a slide member, a leadscrew nut secured to said slide member, a leadscrew disposed in threaded engagement with said leadscrew nut for effecting axial movement of said nut and said slide member attached thereto in response to rotation of said leadscrew, and means for imparting roatry motion to said leadscrew to thereby effect a linear movement of said slide member, improved means for continuously and accurately providing an error compensated output signal proportional to the position of said slide member comprising an error corrector cam provided with convolutions and being affixed to said slide member and movable therewith, a biased cam follower in longitudinally fixed position with respect to said leadscrew and adapted to follow said convolutions of said cam, a position transmitter comprising first and second concentric and relatively rotatable movable parts, means coupling said first part of said transmitter to said leadscrew for rotation therewith, said first part rotating within said second part without any axial displacement of either part with respect to the other part, means coupling said cam follower to said second part of said transmitter to effect oscillatory motion of said second part about said first part in accordance with said convolutions of said cam, said transmitter producing an output signal proportional to the position of said slide member, said output signal being compensated for any deviations in thread pitch of said leadscrew by the oscillatory motion of said second part about said first part effected by said cam follower.

2. The device set forth in claim 1, wherein said coupling means between said first part of said transmitter and said leadscrew comprises a gear system connected to impart a large angular displacement to said first part from a smaller displacement of said leadscrew.

3. The device set forth in claim 1, wherein said position transmitter is a selsyn transmitter, said first movable part being the rotor of said selsyn transmitter and said second movable part being the stator of said selsyn transmitter.

References Cited in the file of this patent
UNITED STATES PATENTS

| | | |
|---|---|---|
| 226,162 | Darling | Apr. 6, 1880 |
| 2,897,464 | Miller | July 28, 1959 |

FOREIGN PATENTS

| | | |
|---|---|---|
| 768,030 | Germany | May 20, 1955 |
| 487,247 | France | Mar. 26, 1918 |